United States Patent [19]

Agnew

[11] Patent Number: 4,662,500

[45] Date of Patent: May 5, 1987

[54] CONVEYOR STOP GATE

[76] Inventor: Vincent R. Agnew, 816 El Vecino, Modesto, Calif. 95350

[21] Appl. No.: 715,774

[22] Filed: Mar. 25, 1985

Related U.S. Application Data

[63] Continuation of Ser. No. 483,958, Apr. 12, 1983, abandoned.

[51] Int. Cl.[4] .............................................. B65G 47/22
[52] U.S. Cl. .................................... 193/40; 193/35 A; 198/463.4
[58] Field of Search .......................... 193/32, 35 A, 40; 198/491, 530, 532, 358, 463.4; 72/402; 267/155

[56] References Cited

U.S. PATENT DOCUMENTS

| | | | |
|---|---|---|---|
| 2,605,097 | 7/1952 | Masoner | 267/155 |
| 2,823,413 | 2/1958 | Stewart | 267/155 |
| 2,980,222 | 4/1961 | Crosby | 193/40 X |
| 3,083,400 | 4/1963 | Anderson | 267/155 X |
| 3,185,277 | 5/1965 | Agnew | 198/358 X |
| 3,561,578 | 2/1971 | Goodwin | 193/32 |
| 4,027,899 | 6/1977 | Hawes et al. | 267/155 X |
| 4,184,579 | 1/1980 | Kantarian et al. | 193/40 X |
| 4,255,642 | 3/1981 | Livera | 72/42 X |

*Primary Examiner*—Jeffrey V. Nase
*Attorney, Agent, or Firm*—Cushman, Darby & Cushman

[57] ABSTRACT

A gate is provided for temporarily stopping a flow of objects moving along a conveyor. The gate is operated by a pneumatic actuator which overcomes the force of a spring to close the gate. The spring which holds the gate open is preferably a helical torsion spring which exerts relatively even force against the arm over the entire travel of the arm. Spring tension is adjustable to minimize the force exerted by the spring. The diaphragm of the pneumatic actuator is made to withstand pressures of up to 120 p.s.i.

10 Claims, 5 Drawing Figures

CONVEYOR STOP GATE

This is a continuation of application Ser. No. 483,958, filed Apr. 12, 1983 and now abandoned.

BACKGROUND OF THE INVENTION

The invention relates generally to a gate or stopping device for automatically stopping a flow of objects such as containers moving along a conveyor in a processing line.

Conveyor systems such as guideways or chutes are conventionally used in the food and beverage industry to process cans and other similar containers. The conveyor carries the containers in a generally continuous flow to various pieces of machinery such as automatic fillers. At certain points in such a conveyor system it is necessary or desirable to temporarily stop the flow of containers, for example to service machinery, remove a blockage, or control the flow rate. Gates, often called can stops, are installed along the conveyor at selected points for this purpose.

One type of prior art can stop is shown in FIG. 7 of U.S. Pat. No. 3,185,277 and consists of an arm (37) which can be pivoted into the path of containers moving on a conveyor. The pivoting arm is normally held out of the path of the containers by means of a conventional tension spring (39). A pneumatic actuator is used to overcome the tension of the spring and move the arm into the path of the containers. The use of such a tension spring for biasing the gate arm presents several disadvantages. First, a tenion spring tends to be non-linear, requiring increased force to stretch the spring as it becomes elongated. The maximum force exerted by the gate closing actuator must therefore be enough to overcome the maximum spring force exerted, which is developed when the gate is closed and the spring is the most elongated. The amount of actuator force is excessive, however, when the gate is just beginning to close and the biasing spring is shorter and exerts less force. The non-linearity of the spring consequently produces a swift and excessively energetic movement of the gate arm when it begins to move, tending to dent or damage light containers such as empty aluminum cans. A second disadvantage of using a tension spring for biasing the gate arm of a conveyor gate is its exposed location. Because the spring pulls the gate arm out of the path of the containers, it is generally located outside of any protective housing and often gets caught and broken by employees monitoring or servicing the conveyor line. Another inherent disadvantage of tension springs is that they have a relatively short life and will fatigue and break in time. If a tension spring should break while the conveyor line is operating, it could present the problem of pieces being scattered and falling into nearby containers.

Prior art can stops which utilize pneumatic actuators are provided with pneumatic diaphragms formed of 1/16 inch neoprene which tends to rupture if exposed to the full line pressure of the pneumatic systems most commonly used in canning facilities. Rupture is normally prevented by operating the actuator through a flow control valve which reduces line pressure. Such flow control valves reduce standard line pressure from approximately 120 pounds per square inch (p.s.i.) down to 10–25 p.s.i. Whenever a flow control valve fails, the full line pressure of 120 p.s.i. enters the pneumatic actuator and rapidly ruptures the diaphragm, necessitating repair and causing delay.

SUMMARY OF THE INVENTION

A gate is provided for interrupting a flow of objects moving along a conveyor. The gate comprises a base and an arm pivotally attached to the base for movement about an axis of rotation between two positions. One position is an extended position in which a portion of the arm will extend across an adjacent conveyor to engage and interrupt a flow of objects thereon. The other position is a retracted position in which the arm will be disengaged from the flow of objects. Spring means are provided for urging the arm into a predetermined one of the two positions. The spring means includes first and second extensions which are urged apart by the spring means. The first extension exerts force against the arm and the second extension exerts force against the base. Actuator means are provided for moving the arm into the other of the two positions, overcoming the force of the spring means. The preferred embodiment of the invention further includes a pneumatic diaphragm in the actuator which is sufficiently strong to withstand pressures of 120 p.s.i. without rupturing.

DESCRIPTION OF THE PREFERRED EMBODIMENT

Figure 1:
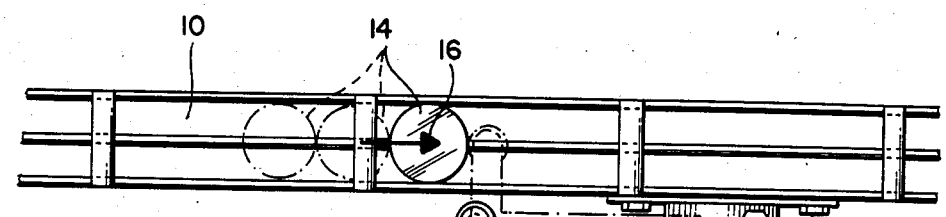
FIG. 1 is a plan view showing the operation of the present invention on a conveyor line.

Referring to FIG. 1, a conveyor line 10 is shown which generally illustrates the operation of a gate 12 according to the present invention. Conveyor 10 is intended to illustrate a portion of a conveyor system or processing line for cans, bottles, or other containers or objects 14 which are moved along the conveyor by any suitable means. In FIG. 1 the objects 14 are moved along a guideway or chute-type conveyor 10 in the direction of arrow 16; the motive force being either mechanical or gravity. Gate 12 is installed adjacent the conveyor 10 at a point where it is desired or necessary to temporarily stop the flow of objects 14.

Figure 2:
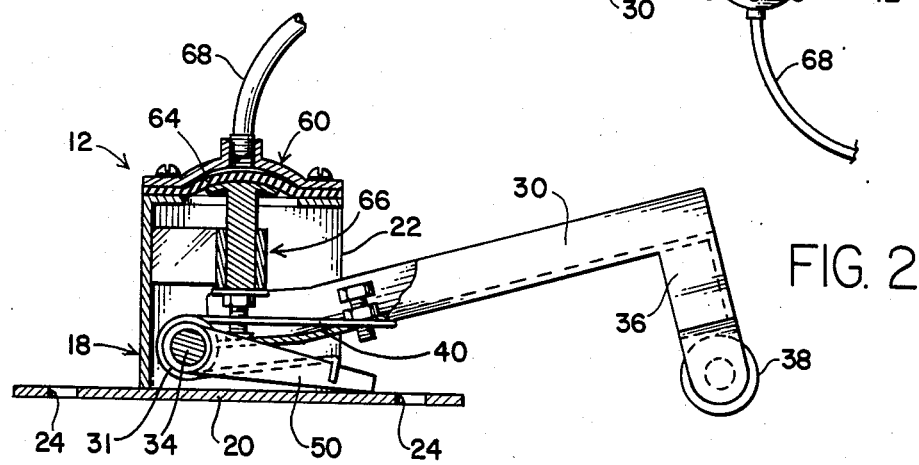
FIG. 2 is an enlarged plan view in partial cross-section showing the gate device of the present invention.
Figure 3:
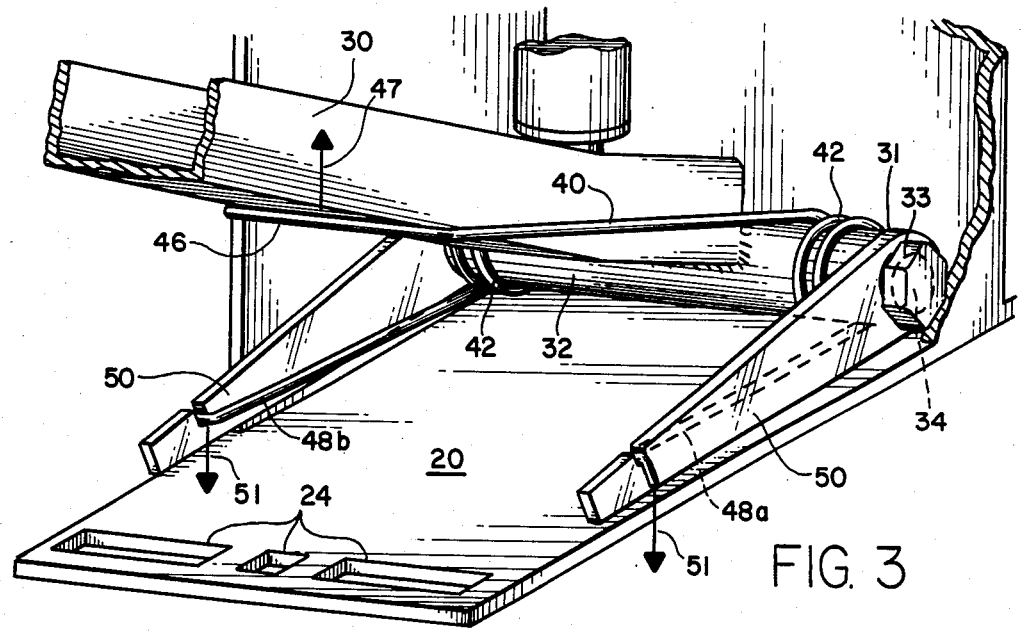
FIG. 3 is a perspective view of a portion of the gate shown in FIG. 2, illustrating the helical torsion spring of the preferred embodiment.

Referring to FIGS. 1, 2 and 3, gate 12 includes a base 18 which in the preferred embodiment consists of a flat plate 20 and a housing 22 which encloses mechanical components of the gate. Bottom plate 20 is provided with a series of openings 24 in the form of slots and holes which can be used to mount the gate adjacent to a conveyor by any suitable means such as bolts 26.

An arm 30 is pivotally attached to the base by hinge-type pivots 31 located at each end of a rotatable shank 32, which forms a part of arm 30. Pivots 31 are secured to the housing by screws 33 extending through opposite walls of base housing 22 (see FIG. 3). Arm 30 is adapted for movement about an axis of rotation 34 between two positions. One position is the extended position, illustrated in phantom in FIG. 1, in which the outer portion 36 of arm 30 extends across adjacent conveyor 10 to engage and intercept the flow of objects 14, stopping the flow. The other position, illustrated with solid lines in FIG. 1 and in FIG. 2, is the retracted position in which the arm is disengaged from the flow of objects on the conveyor. In the retracted position the gate is in effect "open" and the objects 14 on conveyor 10 are free to flow past the gate. A roller 38 located on the outer end of arm 30, helps both to gently intercept objects 14 and to prevent denting.

A spring 40, provided in the preferred embodiment to urge arm 30 into the retracted position, is illustrated most clearly in FIG. 3. Spring 40 is a helical torsion spring, having a helix portion 42 which wraps around the outer ends of arm shank 32. Helix portion 42 has a helical axis which extends generally along the axis of rotation 34 of arm 30. A pair of spring extensions 46 and 48 extend generally tangentially from helical portion 42 and transmit the spring energy to the arm and base. First spring extension 46 forms a bridge between the separated helical portions 42, extending under and exerting force against arm 30 to raise the arm away from base plate 20 in the direction of arrow 47. Second extension 48 is, in the preferred embodiment, divided into two parts 48a and 48b, which are hooked to a pair of members 50, securely fixed with respect to the base. The use of two separate extensions 48a,b, hooked on oppoite sides of the base, more evenly distributes the force exerted by spring 40 against the base, although it will be readily understood that a single such extension would serve if a suitably designed helical torsion spring were used. The second extensions 48a,b exert force against the base through members 50, in the direction of arrows 51.

Figure 4:
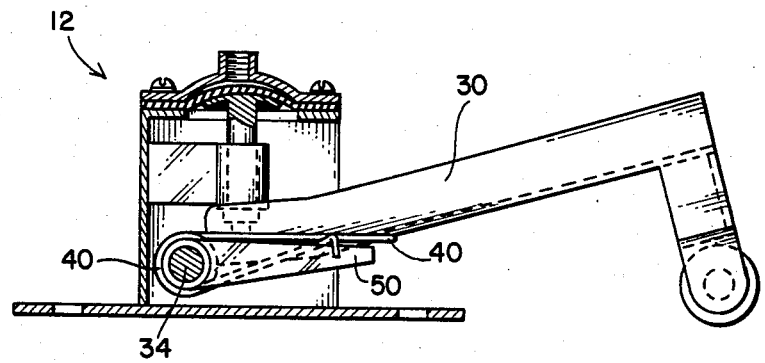
FIG. 4 is a partial cross sectional view as in FIG. 2 showing the spring adjusted for increased tension.

To minimize the force required to keep arm 30 in it retracted position it is advantageous to make the spring tension of spring 40 adjustable. Members 50 constitute a tension adjusting means for varying the tension of spring 40. Referring to FIG. 3, members 50 are located just inside housing 22 on each side of the base, and extend radially outwardly from the axis of rotation of arm 30. Second extensions 48a,b of spring 40 exert force against the base through members 50. The members remain fixed with respect to the body during normal gate operation, but can be conveniently moved to a plurality of positions with respect to base 18 by loosening the screws 33 at each end of the housing, then rotating the members to a new position, and retightening the screws. Members 50 provide a convenient means for repositioning spring extensions 48a,b with respect to base 18 to thereby change the amount of force exerted by spring 40 between the base and arm. FIG. 4 illustrates the gate with the tension of spring 40 increased by having members 50 raised to a new fixed position with respect to the base.

Figure 5:
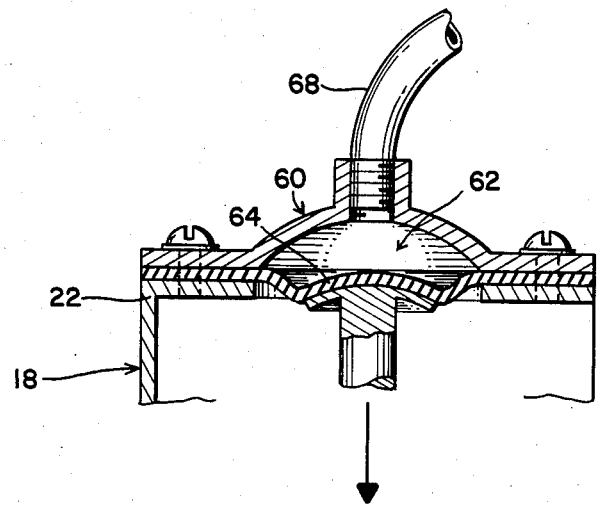
FIG. 5 is a partial cross-sectional view of a portion of the gate shown in FIGS. 2 and 4 in which the pneumatic actuator has been injected with pressurized air.

A pneumatic actuator 60 is employed to move arm 30 to its extended position over the force of spring 40. Pneumatic actuator 60 uses a portion of base housing 22 to form a chamber for receiving pressurizing air, as is best illustrated in FIG. 5. At least one wall of chamber 62 includes a diaphragm 64 which expands outwardly when pressurized air from an external source (not shown) is injected into the chamber. When pressurized air is admitted to the chamber, the diaphragm exerts a force which is opposed to the force exerted by spring 40. The force is transmitted by a plunger mechanism 66 to arm 30 to move the arm into the extended position.

Diaphragm 64 is made of ⅛ inch neoprene, substantially thicker than previous diaphragms used in prior art pneumatic gates or can stops. The extra thickness of the diaphragm makes it sufficiently strong to withstand air pressures of up to 120 p.s.i. in chamber 62. The pressure required to operate the gate under normal conditions is 10–25 p.s.i., which is generally supplied from a high-pressure source (120 p.s.i.) through a conventional needle valve or similar pressure reducer (not shown) to inlet line 68. As mentioned in the background section above, these pressure reducing devices sometimes fail, admitting full house pressure (up to 120 p.s.i.) into chamber 62. The ⅛ inch thick neoprene of diaphragm 64 can accomodate such a pressure without rupturing.

In operation, the gate of the present invention, when mounted adjacent a conveyor as shown in FIG. 1, rests with arm 30 in the retracted position until energized. Whenever it is desired to stop the flow of objects 14 moving on conveyor 10, a valve, solenoid or the like (not shown) is operated, admitting pressurized air into pneumatic actuator 60 through inlet line 68. The air pressure expands diaphragm 64 and moves arm 30 to the extended position, as shown in phantom in FIG. 1.

The present invention is more durable, versatile, and functions more smoothly and gently than previous gates or can stops. Because the spring tension can be varied conventionally, the gate can accommodate being mounted in virtually any orientation. For example, a higher spring tension can be provided when the arm is oriented to retract upward in a vertical plane against the force of gravity. Similarly, the spring tension can be lowered to adjust for arm movement in an horizontal plane. In that way the gate of the present invention is highly versatile, being suitable for use in different environments. A major advantage of being able to minimize the tension of the return spring is that less force is required to close the gate and keep it closed. Les force means that less air must be injected into the pneumatic actuator. The result is lower pressure in the chamber of the pneumatic actuator when the gate is closed and a better cushioning effect to more gently handle the containers or other objects of the conveyor. The smoothness of the arm motion is additionally enhanced by the fact that the helical torsion spring exerts a substantially steady and even force throughout the travel of the arm, eliminating the non-linearity of prior art tension return springs and further minimizing the pressure which must be exerted by the pneumatic actuator. Because the spring is almost entirely enclosed withih the housing of the base, it is protected from breakage caused by conveyor line personnel or other line related hazards. In addition, the thicker diaphragm eliminates the need for laborious and time-consuming diaphragm replacement when a line pressure regulator fails.

Alternative embodiments are possible within the scope of the present invention. For example, a gate could be made which is normally closed and which would be opened upon the operation of an actuator. The spring would simply be reversed or relocated to urge the arm toward the other (extended) position and the actuator would be reversed. Similarly, other types of tension adjusting means could be conceived to reposition the second extension of the spring relative to the base. An example of such an alternative tension adjusting means would be a series of openings or grooves into which one or the other of the spring extensions could be moved to change the tension.

What is claimed is:

1. A gate apparatus for interrupting a flow of objects moving along a conveyor, comprising:
   a base including flat plate, for mounting said apparatus to said conveyor, and a housing covering said flat plate;
   an arm pivotally attached to said housing of said base for movement about an axis of rotation between two positions, one position being an extended position in which a portion of said arm will extend across said conveyor to engage and interrupt the flow or objects thereon and the other position being a retracted position in which said arm will be disengaged from the flow of objects;
   a spring, substantially enclosed within said housing, for urging said arm into a predetermined one of said two positions, said spring including first and second extensions which are urged apart from one another, said first extension exerting force against said arm;
   tension adjusting means, substantially enclosed within said housing, for adjusting the tension of said spring, said second extension of said spring exerting force against said tenion adjusting means, said tension adjusting means being movable to a plurality of positions for repositioning said second extension relative to said flat plate of said base thereby adjusting the amount of force exerted by said first extension against said arm; and
   actuator means, substantially enclosed within said housing, for moving said arm into the other of said two positions over the force of said spring.

2. A gate as in claim 1 in which said diaphragm is sufficiently strong to withstand air pressures of up to 120 pounds per square inch in the chamber of said pneumatic actuator.

3. A gate for interrupting a flow of objects moving along a conveyor, comprising:
   a base including a flat plate, for mounting the gate adjacent to the conveyor, and a housing covering said flat plate;
   an arm pivotally attached to said housing of said base for movement about an axis of rotation between two positions, one position being an extended position in which a portion of said arm will extend across the adjacent conveyor to engage and interrupt the flow of objects thereon and the other position being a retracted position in which said arm will be disengaged from the flow of objects;
   a helical torsion spring, substantially enclosed within said housing, for urging said arm into a predetermined one of said two positions, said helical torsion spring having a helical axis extending generally along the axis of rotation of said arm and having first and second extensions which are urged apart by said helical torsion spring, said first extension exerting force against said arm;
   tension adjusting means, substantially enclosed within said housing, for adjusting the tension of said spring, said second extension of said spring exerting force against said tension adjusting means, said tension adjusting means being movable to a plurality of positions for repositioning said second extension relative to said flat plate of said base, thereby adjusting the amount of force exerted by said first extension against said arm; and
   a pneumatic actuator, substantially enclosed within said housing, which includes means forming a chamber for receiving pressurized air, wherein at least one wall of the chamber includes a diaphragm which expands outwardly when pressurized air from an external source is injected into the chamber, said diaphragm exerting a force when expanded which is opposed to the force exerted by said helical torsion spring to move said arm to the other said two positions.

4. In a conveyor for moving objects along a processing line, a gate for interrupting the flow of such objects comprising:
   a base, including a flat plate, mounted adjacent the conveyor, and a housing covering said flat plate;
   an arm pivotally attached to said housing of said base for movement about an axis of rotation between an extended position in which a portion of said arm extends across the conveyor to engage and interrupt the flow or objects and a retracted position in which said arm is disengaged from the flow of objects;
   a spring, substantially enclosed within said housing, for urging said arm into a predetermined one of said two positions, said spring including first and second extensions which are urged apart from one another, said first extension exerting force against said arm;
   tension adjusting means, substantially enclosed within said housing, for adjusting the tension of said spring, said second extension of said spring exerting force against said tension adjusting means, said tension adjusting means being movable to a plurality of positions for repositioning said second extension relative to said flat plate of said base thereby adjusting the amount of force exerted by said first extension against said arm; and
   actuator means, substantially enclosed within said housing, for moving said arm into the other of said two position over the force of said spring.

5. In a conveyor system as in claim 4, said spring being a helical torsion spring from which said first and second extensions extend generally tangentially, said helical torsion spring having a helical axis extending generally along the axis of rotation of said arm.

6. In a conveyor system as in claim 4 said actuator means in the gate means being a pneumatic actuator which includes means forming a chamber for receiving pressurized air, wherein at least one wall of the chamber includes a diaphragm which expands outwardly when pressurized air from an external source is injected into the chamber, said diaphragm exerting a force when expanded which is opposed to the force exerted by said spring to move said arm to the extended position.

7. In a conveyor system as in claim 6, said diaphragm in said pneumatic actuator being sufficiently strong to withstand air pressures of up to 120 pounds per square inch in the chamber of said pneumatic actuator.

8. A gate as in claim 7, said spring being a helical torsion spring from which said first and second extensions extend generally tangentially, said helical torsion spring having a helical axis extending generally along the axis of rotation of said arm.

9. A gate as in claim 7 in which said actuator means is a pneumatic actuator which includes means forming a chamber for receiving pressurized air, wherein at least one wall of the chamber includes a diaphragm which expands outwardly when pressurized air from an external source is injected into the chamber, said diaphragm exerting a force when expanded which is opposed to the force exerted by said spring to move said arm to said other of said two positions.

10. A gate as in claim 9 in which said diaphragm is sufficiently strong to withstand air pressures of up to 120 pounds per square inch in the chamber of said pneumatic actuator.

* * * * *